(12) United States Patent
Zolla et al.

(10) Patent No.: US 6,917,758 B1
(45) Date of Patent: Jul. 12, 2005

(54) METHOD OF IMAGE COMPENSATION FOR WATERMARKED FILM

(75) Inventors: Robert J. Zolla, Rochester, NY (US); Paul W. Jones, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/742,167

(22) Filed: Dec. 19, 2003

(51) Int. Cl.$^7$ ............................ G03B 41/00; G03C 7/00
(52) U.S. Cl. ...................................... 396/563; 430/359
(58) Field of Search ........................ 396/563; 356/443, 356/444; 430/30, 359

(56) References Cited

U.S. PATENT DOCUMENTS

| | | | |
|---|---|---|---|
| 4,760,407 A | | 7/1988 | Arimoto et al. ............ 346/108 |
| 5,155,588 A | | 10/1992 | Levien ........................ 358/80 |
| 5,543,883 A | * | 8/1996 | Green ......................... 396/563 |
| 5,667,944 A | * | 9/1997 | Reem et al. ................. 430/359 |
| 5,671,070 A | | 9/1997 | Przybylowicz et al. ..... 358/487 |
| 5,705,327 A | * | 1/1998 | Brewer et al. .............. 430/504 |
| 5,752,152 A | | 5/1998 | Gasper et al. .............. 398/366 |
| 6,044,182 A | | 3/2000 | Daly et al. .................. 382/284 |
| 6,154,272 A | * | 11/2000 | Vanderbrook ................ 355/77 |
| 6,215,547 B1 | | 4/2001 | Ramanujan et al. .......... 355/67 |
| 6,274,299 B1 | * | 8/2001 | Buhr et al. .................. 430/359 |
| 6,330,018 B1 | | 12/2001 | Ramanujan et al. ........ 347/239 |
| 6,384,856 B2 | | 5/2002 | Nakagawa et al. .......... 347/233 |
| 6,407,737 B1 | | 6/2002 | Zhao et al. .................. 345/424 |
| 6,496,818 B1 | | 12/2002 | Ponte ............................ 707/2 |
| 6,624,949 B2 | | 9/2003 | Roddy et al. ................ 359/634 |
| 2002/0126199 A1 | | 9/2002 | Yarid et al. .................. 347/225 |
| 2003/0079130 A1 | | 4/2003 | Reed ........................... 713/176 |
| 2004/0150794 A1 | | 8/2004 | Kurtz et al. .................. 353/31 |
| 2004/0156111 A1 | | 8/2004 | Roddy et al. ................ 359/618 |

FOREIGN PATENT DOCUMENTS

FR 2 811 258 7/2000 ............ B41M/3/10

OTHER PUBLICATIONS

Roy Berns; Billmeyer and Saltzman's Principles of Color Technology, Third Edition; 2000, pp. 14–16.

* cited by examiner

*Primary Examiner*—W. B. Perkey
(74) *Attorney, Agent, or Firm*—Andrew J. Anderson

(57) ABSTRACT

A method for obtaining an adjusted digital image which is compensated for a watermark exposure is described comprising: determining a first sensitometric response of a photographic media without a watermark exposure; determining a second sensitometric response of the photographic media with a watermark exposure; generating a look-up table (LUT) from the first and second sensitometric responses; and modifying a digital representation of an image which is to be printed onto the photographic media in accordance with the look-up table to produce an adjusted digital image. The adjusted digital image may be printed directly onto a final print photographic film that receives a watermark exposure, or may be printed onto a printing negative photographic film to produce a printing negative with an adjusted image, which adjusted image is then printed onto a final print photographic film that receives a watermark exposure. In another embodiment, the characteristic response of a digital film printer may be modified in accordance with a LUT generated from the first and second sensitometric responses, instead of modifying the digital representation of the image which is to be printed onto the photographic media.

20 Claims, 4 Drawing Sheets

LOOK-UP TABLE GENERATION

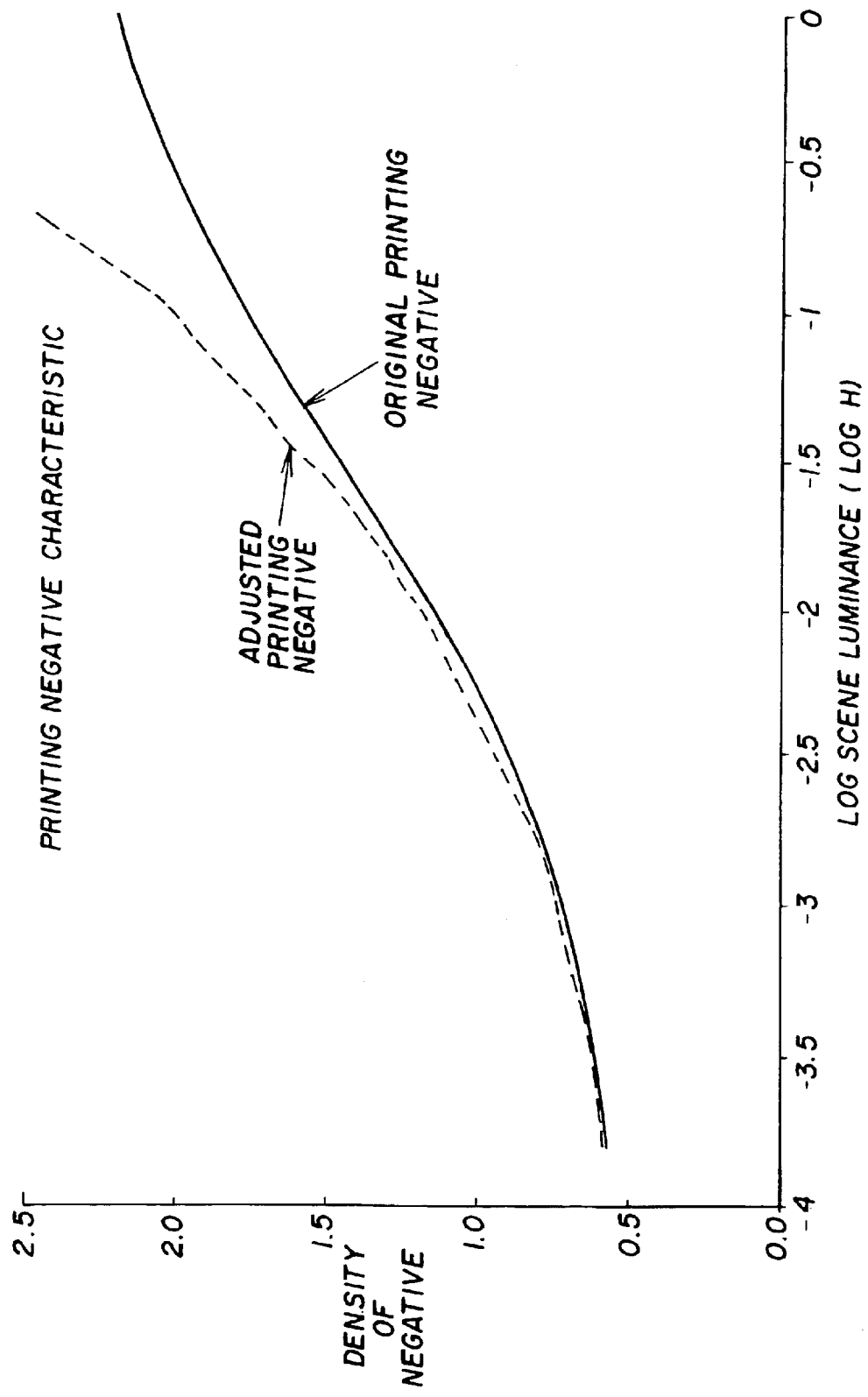

METHOD OF IMAGE COMPENSATION FOR WATERMARKED FILM

FIELD OF THE INVENTION

This invention relates to image manipulation in general, and in particular to compensating a digital image for photographic media that has a watermark exposure.

BACKGROUND OF THE INVENTION

Unauthorized copying and distribution of motion pictures represents a significant source of lost revenue for the movie studios. Advances in technology have made it easier to make and distribute unauthorized copies of such materials. There exists a need to identify unauthorized copies and to track them to the source of the copy. One method to identify the source of the copy is to expose motion picture print film with a latent image watermark over the entire image forming area of the film before or after printing the motion picture content. The watermark pattern may be digitally created and can be designed such that it is not visually objectionable when viewing the final motion picture. The watermark pattern can be subsequently extracted from an unauthorized copy of the film and used to determine the source of the copy. The watermark can have the visual effect of adding a slight amount of noise or "grain" to the image, which may not be objectionable, but such an exposure also alters the effective sensitometric characteristics of the film, adversely modifying the tone scale of the reproduced image.

In commonly-assigned, co-pending U.S. patent application Ser. No. 10/364,488, Roddy et al, it is shown that exposing film with a watermark preferably requires the modification of the film sensitometric response to compensate for the watermark. This compensation, namely, increasing the contrast in the low density or "toe" portion of the film's sensitometric response, requires that the film's emulsion be reformulated, which is an expensive and time consuming undertaking. While this approach produces the optimal image characteristics, there may be circumstances involving manufacturing costs or schedules in which it may be desirable to apply a watermark to motion picture print film without modifying the film's sensitometric characteristics. However, doing so will significantly degrade the tone scale of the final print, and this degradation cannot be corrected by conventional means in the motion picture production laboratories during printing operations. Some alternative means of compensation must be employed.

The concept of modifying an image digitally is well known in the imaging industry. In patent publication U.S. 2003/0079130 Al, Reed teaches the use of a look-up table to preserve the integrity of a watermark through the dot gain inherent in ink based printing. Look-up tables have been used to compensate for spatial irregularities existing within digital printing devices, as is disclosed in patent publication U.S. 2002/0126199 Al (Yarid et al) and U.S. Pat. No. 6,384,856 B2 (Nakagawa et al). Look-up tables have also been applied to the problem of maintaining tonal consistency between hard-copy (printed) images and soft-copy (e.g., CRT) displays (U.S. Pat. No. 5,671,070 A). Additionally, in U.S. Pat. No. 5,155,588 A, Levien teaches the use of stored gamma correction values on a point basis for selectively modifying a region of an image by manually identifying the region through the use of a display screen and computer trackball or mouse.

However, the problem created by the exposure of the motion picture print film with a watermark is not one of spatial correction. It is a problem of modifying tone scale based upon image content and watermark exposure. Prior art spatial correction approaches for modifying individual images are impractical for modifying the scene content in a full length motion picture, as a typical two hour long movie contains over 172,000 individual images. Therefore, it can be seen that a need exists to provide a means for modifying motion picture images to compensate for the sensitometric effects of a watermark exposure on print film.

SUMMARY OF THE INVENTION

It is an object of this invention to provide a method capable of compensating for image tone scale effects caused by of exposure of a watermark onto a photographic film. The present invention is directed at overcoming one or more of the problems set forth in the background of the invention.

According to one embodiment of the present invention, a method for obtaining an adjusted digital image which is compensated for a watermark exposure is described comprising: determining a first sensitometric response of a photographic media without a watermark exposure; determining a second sensitometric response of the photographic media with a watermark exposure; generating a look-up table (LUT) from the first and second sensitometric responses; and modifying a digital representation of an image which is to be printed onto the photographic media in accordance with the look-up table to produce an adjusted digital image. The adjusted digital image may be printed directly onto a final print photographic film that receives a watermark exposure, or may be printed onto a printing negative photographic film to produce a printing negative with an adjusted image, which adjusted image is then printed onto a final print photographic film that receives a watermark exposure.

In another embodiment of the invention, the characteristic response of a digital film printer may be modified in accordance with a LUT generated from the first and second sensitometric responses, instead of modifying the digital representation of the image which is to be printed onto the photographic media.

The invention and its objects and advantages will become more apparent in the detailed description of the preferred embodiment presented below.

BRIEF DESCRIPTION OF THE DRAWINGS

FIG. 4 is a graph of the printing negative sensitometric response.

DETAILED DESCRIPTION OF THE INVENTION

It is to be understood that elements not specifically shown or described may take various forms well known to those skilled in the art. Throughout this discussion, only the green sensitive layer of the film's emulsion will be discussed, with the behavior of the red and blue sensitive layers being similar. In addition, motion picture print film is used in describing the preferred embodiments, but it will be obvious to those skilled in the art that the same methods could be applied to other photographic systems, e.g., still-frame systems and/or photographic paper, where a watermark is exposed onto film or other light-sensitive photographic media.

Figure 1:
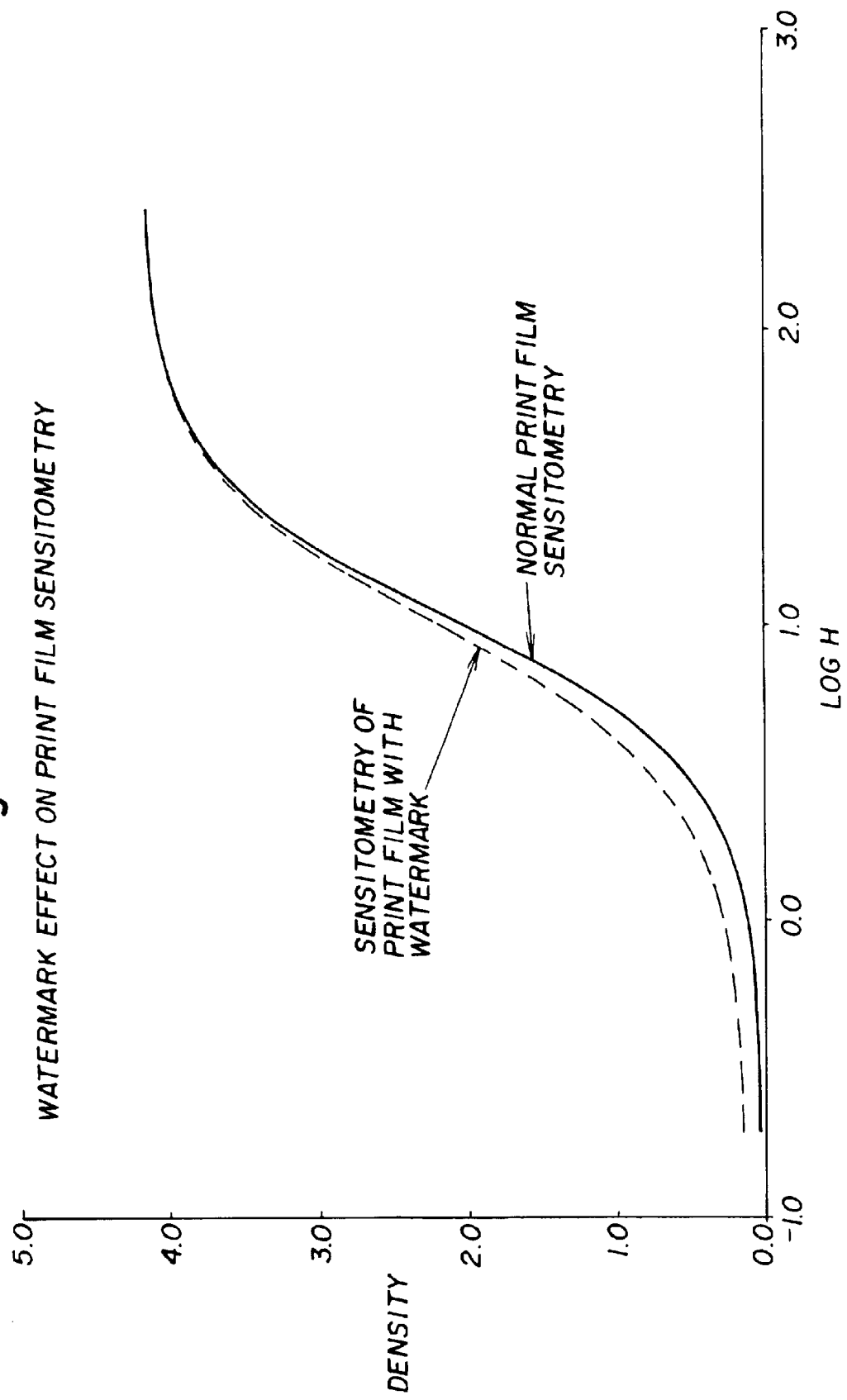
FIG. 1 is a graph of the effect of a watermark exposure on a film's sensitometric response.

The sensitometric response of a film is typically represented as the developed density as a function of log exposure. FIG. 1 shows the sensitometric response of the green sensitive emulsion layer of Eastman Kodak Color Print Film 2383, a typical color motion picture print film. Only the green layer response is shown for clarity. The curve shapes and responses of the red and blue sensitive emulsion layers are similar. Referring now to FIG. 1, it is readily seen that the watermark exposure raises the minimum density (Dmin) of the film and reduces contrast in the low to mid-scale densities (the highlight tones and middle tones of the image). If uncorrected, this would result in visually unacceptable images. In addition to the reduction of mid-scale and highlight contrast, unless sensitometric responses were properly matched in all three layers of the film, it would be impossible to achieve a uniform neutral color response over the entire density range of the film.

Figure 2:
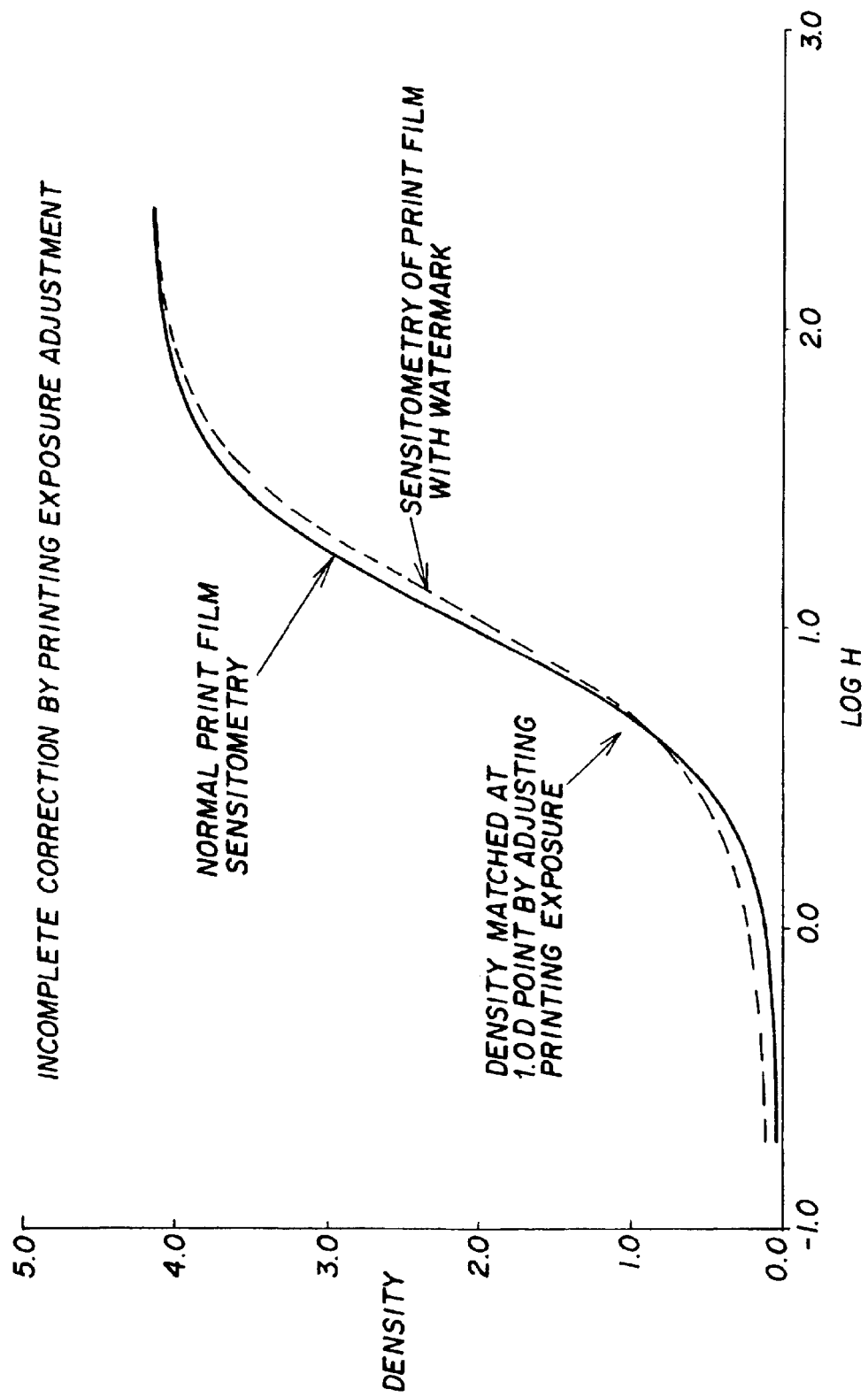
FIG. 2 is a graph of matching densities at a single point for watermarked and non-watermarked films.

During the printing operations, the motion picture production laboratories correct for color errors in the final print film by varying the overall red, green and blue exposures to achieve a neutral balance. This conventional approach will not work for a film that has a watermark exposure. FIG. 2 shows the effect of attempting to correct for the watermark by varying the overall printing exposure for the green sensitive layer. The two curves showing the normal film response and the watermarked film response can be made to match only at one density point. In this case, the densities have been matched at the 1.0 density point. Only at this point can neutrality be achieved. At densities below this point (lighter tones), the image will exhibit a magenta cast. At densities above 1.0 (darker tones), the image will exhibit a green cast. Similar effects would occur in both the red and blue layers (albeit with different color casts) if they also had received a watermark exposure.

Figure 3:
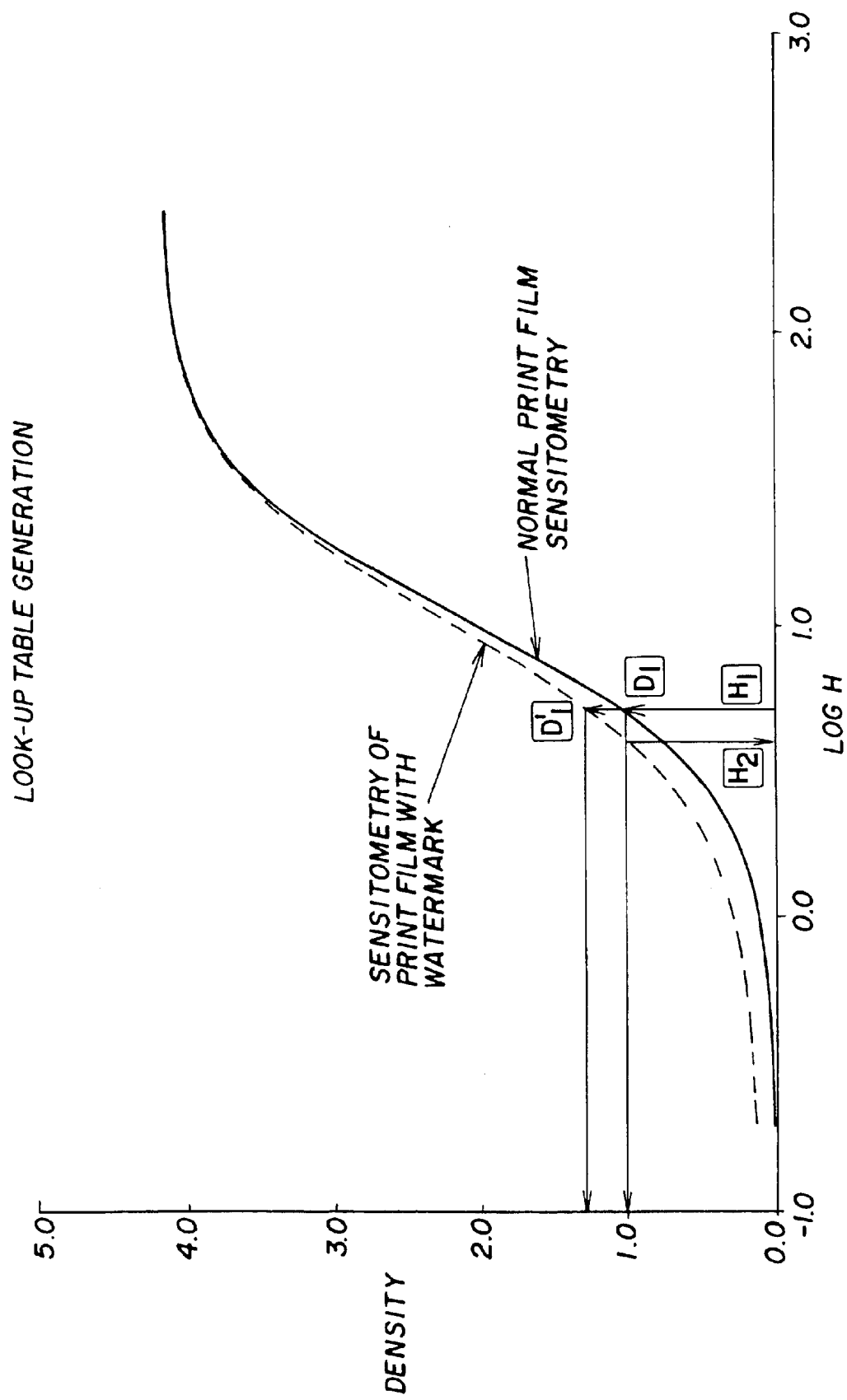
FIG. 3 is a graph showing the generation of a LUT from the sensitometric data.

The deficiencies in tone scale reproduction on the finished print film resulting from a watermark exposure can be corrected by modifying the image content prior to printing on the watermarked film. The amount of correction needed to achieve proper tone scale varies with the final print densities of various portions of the image. Sensitometric responses for the film without and with a watermark exposure are used to generate this correction. For example, referring to FIG. 3, an exposure of $H_1$ corresponding to an object in the original scene would normally result in a density of $D_1$ equal to 1.0 for conventional print film. It can be seen, however, that if a watermark exposure is placed on the film, this exposure $H_1$ would result in a density of $D_1'$ equal to 1.3, an error of plus 0.3 density. The resultant image would obviously be too dark at that point. To reproduce the object at a density of 1.0 the watermarked film would require a reduced exposure, $H_2$, of approximately 0.1 Log units less (exposure $H_2$ is approximately 80% of exposure $H_1$). Furthermore, as can be seen from the two curves in FIG. 3, the amount of exposure correction is not constant, but instead varies with print density. Therefore, the process of mapping exposure through the two sensitometric responses needs to be performed on a point-by-point basis over the range of the sensitometric responses. These points need to be spaced sufficiently close together in order to accurately follow the response curves to avoid introducing image artifacts as a result of the mapping process. This process would be repeated for the red and blue layers of the film, depending upon whether or not they also received a watermark exposure. A computer can be used to perform these operations due to the large number of points needed. The resulting data from this mapping process provides information as to the exposure needed to achieve any desired density with the print film that has a watermark exposure.

In motion picture production, several stages of duplication of the original camera negative are employed. In order to produce the large quantities of release print films required for distribution to theaters, several final printing negatives are typically prepared for high-speed duplication onto the print film stock. In a preferred embodiment, the final print film's exposure is controlled by the printing negative's densities. The negative acts upon the printing light source as a spatial attenuator, independently controlling the red, green and blue components of the light source at each point in an image. If the printing negative densities are not altered to compensate for the watermark, the final print densities will be incorrect. It is necessary to produce a printing negative with an adjusted image. The amount of adjustment of the printing negative's densities can be determined from the data obtained from the print film's sensitometric characteristics with and without the watermark exposure as discussed above. For example, to reproduce an object in the final print at a density of 1.0, the object would normally appear on a negative at a density of approximately 1.2 in the green layer (similar values can be found for the red and blue layers). The portions of the negative at this density have a transmission of 6% ($10^{-1.2}$). Normally, the printer would be adjusted such that portions of the negative having this density would print to 1.0 density, an exposure of approximately 0.7 log units. However, as previously discussed, this exposure would result in a density of 1.3 on film containing a watermark. The watermarked print film requires only a 0.6 log exposure to produce a 1.0 density. The exposure on the final print film has to be reduced by 20%, which means that the printing negative density has to increase from 1.2 to 1.32 to correct for the watermark exposure. Mathematically, this can be shown as:

$$\text{Log} H_1 = 0.7, \text{Log} H_2 = 0.6$$

$$\Delta \text{Log} H = 0.1, \text{ or } \text{Log} \frac{H_1}{H_2} = 0.1$$

$$\frac{H_1}{H_2} = 10^{0.1} = 1.25, \text{ or } H_2 = 0.8 H_1$$

Since the corresponding negative density for exposure $H_1$ is 1.2, the adjusted negative's density to produce exposure $H_2$ on the final print can be found by:

$$\text{Transmission } T = 10^{-D}$$

$$D_1 = 1.2, \text{ so } T_1 = 10^{-1.2} = 0.06$$

$$\text{Log}(T_1 \times K) = 0.7 \text{ where } K \text{ is a printing exposure constant}$$

$$\text{Log}(T_2 \times K) = 0.6$$

$$T_1 \times K = 10^{0.7} \text{ and } T_2 \times K = 10^{0.6}$$

$$\frac{(T_1 \times K)}{(T_2 \times K)} = \frac{10^{0.7}}{10^{0.6}}$$

$$\frac{T_1}{T_2} = 10^{0.1} \text{ or } T_2 = \frac{T_1}{10^{0.1}} = 0.048$$

Therefore, the adjusted density $D_2$ is:

$$D_2 = -\text{Log } T_2 = -\text{Log } 0.048 = 1.32$$

At various negative densities, differing corrections will be needed. FIG. 4 shows the relationship between the original scene luminance and the negative densities for the original printing negative and a printing negative with an adjusted image. It can be seen that the adjusted printing negative requires increasingly higher densities for bright objects to compensate for the print film's watermark exposure. Such a response cannot be obtained by the use of filters or an overall exposure adjustment. It must instead be achieved on a point-by-point basis across the extent of the printing negative. This necessitates the production of the adjusted printing negative on a digital film printer.

It is common practice in the industry to produce negatives on a digital film printer. In common use are flying spot laser printers, CRT based printers, and a new generation of film printers employing spatial light modulators of various types. All of these printers share the common characteristic of exposing a number of pixels onto film, with the density of each resultant pixel controlled by a digital code value. Original scene content may be digitally generated or scanned from a conventional camera negative to produce a sequence of digital images. Each digital image contains pixel values that correspond to the desired image densities on the film. Each digital image may be modified to produce an adjusted printing negative. By employing the sensitometric responses previously obtained and calculating the adjusted densities as shown above, a look-up table relating the original scene code values to adjusted code values representing the desired densities in the adjusted printing negative can be produced. This look-up table may be applied to the digital image data to create an adjusted digital image prior to printing or it may be applied during printing as the image data is streaming to the printer.

In another embodiment of the invention, the digital image data need not be modified. Instead, a characteristic response of a digital printer may be modified in accordance with the look-up table to produce an adjusted digital printer, wherein the adjusted digital printer is to be used to print a digital representation of an image which is to be printed onto the photographic media. The printer response accordingly may be adjusted in an appropriate manner so as to produce, e.g., a printing negative with the same characteristics as would occur if the image data were adjusted. This may again be accomplished by using a look-up table within the printer to modify its digital code value to exposure characteristics, or it may be accomplished by modifying the calibration parameters of the printer. The exact approach is printer specific, and variations upon this invention would be obvious to those skilled in the art.

In yet further embodiments of the invention, adjusted digital image data may be printed directly onto watermarked print film using a digital film printer, instead of generating an adjusted printing negative. A LUT generated from the sensitometric data may be used to modify the image data before writing to the film, or the printer's characteristic response may be modified by a similarly generated LUT, or by modifying the printer's calibration parameters in accordance with the sensitometric responses. Again, the exact approach is printer specific, and variations upon this embodiment of the invention would be obvious to those skilled in the art.

Although the preceding description has been primarily described in connection with embodiments wherein the print film receives a watermark prior to the scene content exposure, the invention is also clearly applicable to processes wherein the film receives the watermark exposure after, or essentially simultaneously with, the scene content exposure. While the order of the watermark and scene content exposures may slightly alter the sensitometric response of the film, look-up tables may be generated which account for the altered sensitometric responses dependent upon each intended exposure sequence.

The invention has been described in detail with particular reference to certain preferred embodiments thereof, but it will be understood that further variations and modifications can be effected within the spirit and scope of the invention.

What is claimed is:

1. A method for obtaining an adjusted digital image which is compensated for a watermark exposure comprising:
   determining a first sensitometric response of a photographic media without a watermark exposure;
   determining a second sensitometric response of the photographic media with a watermark exposure;
   generating a look-up table from the first and second sensitometric responses; and
   modifying a digital representation of an image which is to be printed onto the photographic media in accordance with the look-up table to produce the adjusted digital image.

2. The method according to claim 1, further comprising the step of printing the adjusted digital image onto a printing negative photographic film to produce a printing negative with an adjusted image.

3. The method according to claim 2, further comprising the step of exposing the printing negative adjusted image onto a final print photographic film that receives a watermark exposure.

4. The method according to claim 3, wherein the final print film receives a watermark exposure prior to the step of exposing the printing negative adjusted image onto the final print film.

5. The method according to claim 3, wherein the final print film receives a watermark exposure after the step of exposing the printing negative adjusted image onto the final print film.

6. The method according to claim 3, wherein the final print film receives a watermark exposure essentially simultaneously with the step of exposing the printing negative adjusted image onto the final print film.

7. The method according to claim 1, further comprising the step of printing the adjusted digital image onto a final print photographic film that receives a watermark exposure.

8. The method according to claim 7, wherein the final print film receives a watermark exposure prior to the step of printing the adjusted digital image onto the final print film.

9. The method according to claim 7, wherein the final print film receives a watermark exposure after the step of printing the adjusted digital image onto the final print film.

10. The method according to claim 7, wherein the final print film receives a watermark exposure essentially simultaneously with the step of printing the adjusted digital image onto the final print film.

11. A method for compensating a digital printer for a watermark exposure comprising:
    determining a first sensitometric response of a photographic media without a watermark exposure;
    determining a second sensitometric response of the photographic media with a watermark exposure;
    generating a look-up table from the first and second sensitometric responses; and
    modifying a characteristic response of a digital printer in accordance with the look-up table to produce an adjusted digital printer, wherein the adjusted digital printer is to be used to print a digital representation of an image, which image is to be printed onto photographic media which receives a watermark exposure.

12. The method according to claim 11, further comprising the step of printing a digital image onto a printing negative photographic film using the adjusted digital printer to produce a printing negative with an adjusted image.

13. The method according to claim 12, further comprising the step of exposing the printing negative adjusted image onto a final print photographic film that receives a watermark exposure.

14. The method according to claim 13, wherein the final print film receives a watermark exposure prior to the step of exposing the printing negative adjusted image onto the final print film.

15. The method according to claim 13, wherein the final print film receives a watermark exposure after the step of exposing the printing negative adjusted image onto the final print film.

16. The method according to claim 13, wherein the final print film receives a watermark exposure essentially simultaneously with the step of exposing the printing negative adjusted image onto the final print film.

17. The method according to claim 11, further comprising the step of using the adjusted digital printer to print a digital image onto a final print photographic film that receives a watermark exposure.

18. The method according to claim 17, wherein the final print film receives a watermark exposure prior to the step of printing the digital image onto the final print film.

19. The method according to claim 17, wherein the final print film receives a watermark exposure after the step of printing the digital image onto the final print film.

20. The method according to claim 17, wherein the final print film receives a watermark exposure essentially simultaneously with the step of printing the digital image onto the final print film.

* * * * *